United States Patent [19]

Wayland

[11] Patent Number: 5,060,414

[45] Date of Patent: Oct. 29, 1991

[54] PHYTOTOXICITY OF A COMBINED RF AND MICROWAVE ELECTROMAGNETIC FIELD

[76] Inventor: J. Robert Wayland, 500 Oakwood Pl. NE., Albuquerque, N. Mex. 87123

[21] Appl. No.: 382,205

[22] Filed: Jul. 20, 1989

[51] Int. Cl.⁵ .............................................. A01G 1/00
[52] U.S. Cl. ...................................................... 47/1.3
[58] Field of Search .................. 47/1.3, DIG. 9, 1.42; 422/21, 22

[56] References Cited

U.S. PATENT DOCUMENTS

| | | |
|---|---|---|
| 2,006,265 | 6/1935 | Davis ..................................... 47/1.3 |
| 2,040,600 | 5/1936 | Davis ..................................... 47/1.3 |
| 2,064,522 | 12/1936 | Davis ..................................... 47/1.3 |
| 2,084,004 | 6/1937 | Riccioni ............................. 47/1.3 X |
| 2,089,966 | 8/1937 | Kassner ............................. 47/1.3 X |
| 2,223,813 | 12/1940 | Brown ................................. 47/1.3 X |
| 2,712,713 | 7/1955 | Jonas ..................................... 47/1.3 |
| 3,307,289 | 3/1967 | Lemm ..................................... 47/1.3 |
| 3,499,436 | 3/1970 | Balamuth ........................... 47/1.3 X |
| 3,902,273 | 9/1975 | Friedman ..................... 47/DIG. 12 |
| 3,940,885 | 3/1976 | Gray ......................................... 47/58 |
| 4,092,800 | 6/1978 | Wayland et al. ......................... 47/58 |
| 4,251,950 | 2/1981 | Farque et al. .......................... 47/1.3 |
| 4,818,488 | 4/1989 | Jacob ..................................... 422/22 |

FOREIGN PATENT DOCUMENTS

| | | | |
|---|---|---|---|
| 505334 | 9/1951 | Belgium .............................. 422/22 |
| 1114623 | 9/1984 | U.S.S.R. ............................... 422/22 |
| 2224022 | 4/1990 | United Kingdom ................. 422/21 |

Primary Examiner—James R. Feyrer
Attorney, Agent, or Firm—John E. Halamka

[57] ABSTRACT

A method and device for vegetation control. More particularly a technique of a plurality of steps in the application of electromagnetic fields of two or more selected but different frequencies, at least one in the ratio frequency range being first applied followed by application of others in the microwave region, to the area in which vegetation is to be controlled.

8 Claims, 5 Drawing Sheets

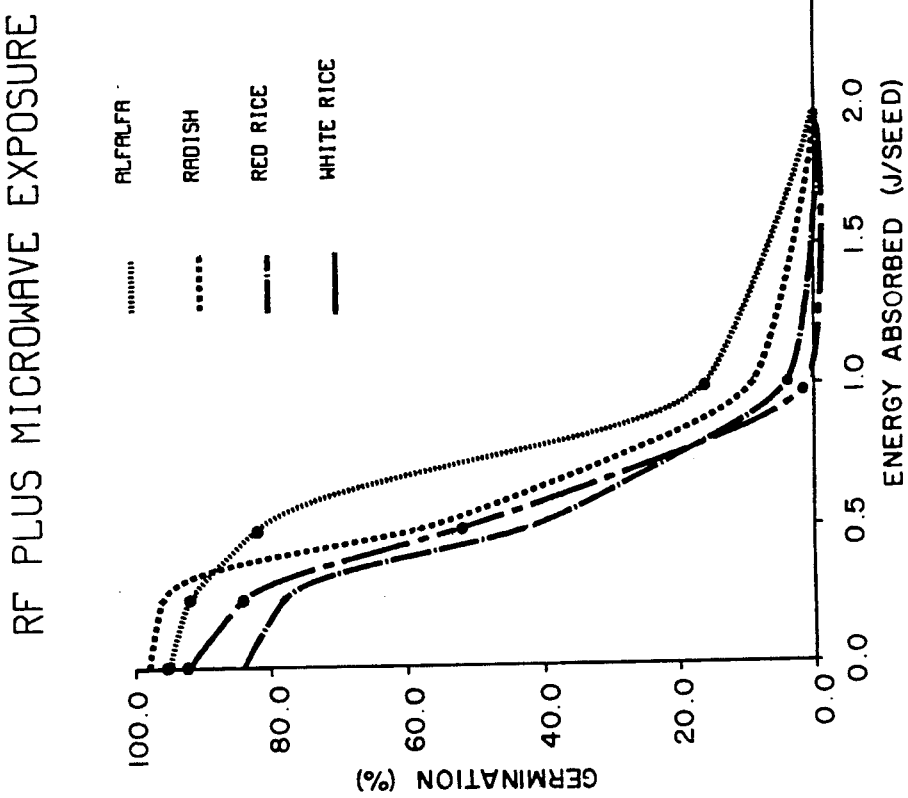
Fig. 3. RF EXPOSURE
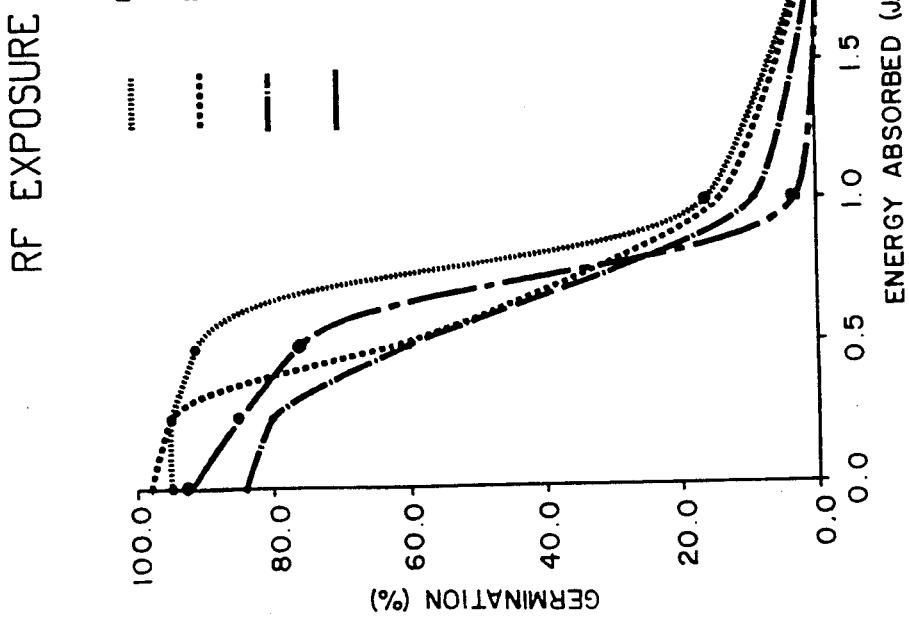
Fig. 4. RF PLUS MICROWAVE EXPOSURE

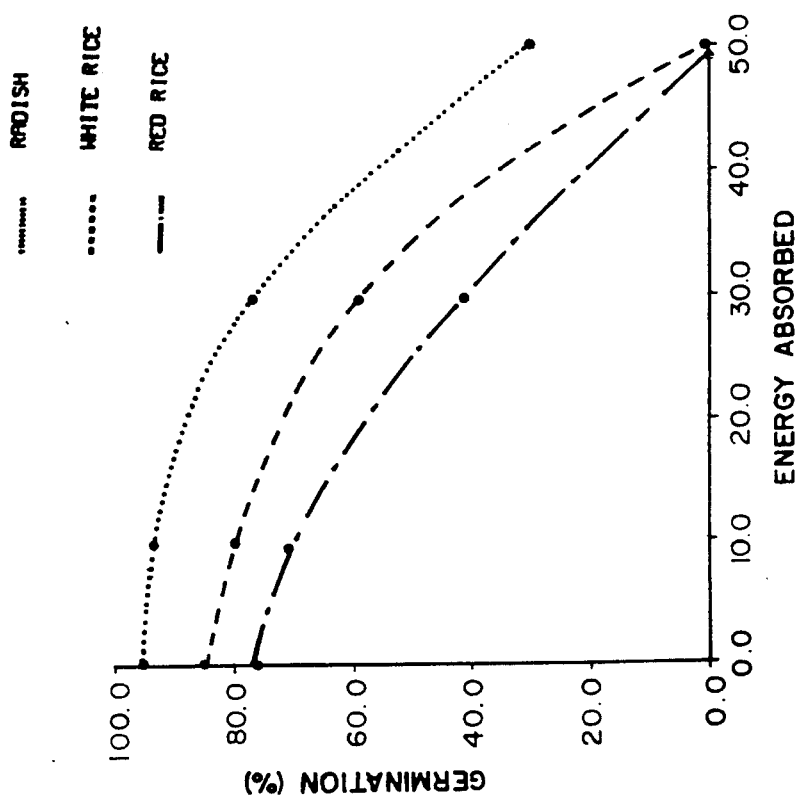
Fig. 6. RESPONSE TO RF IN SANDY LOAM
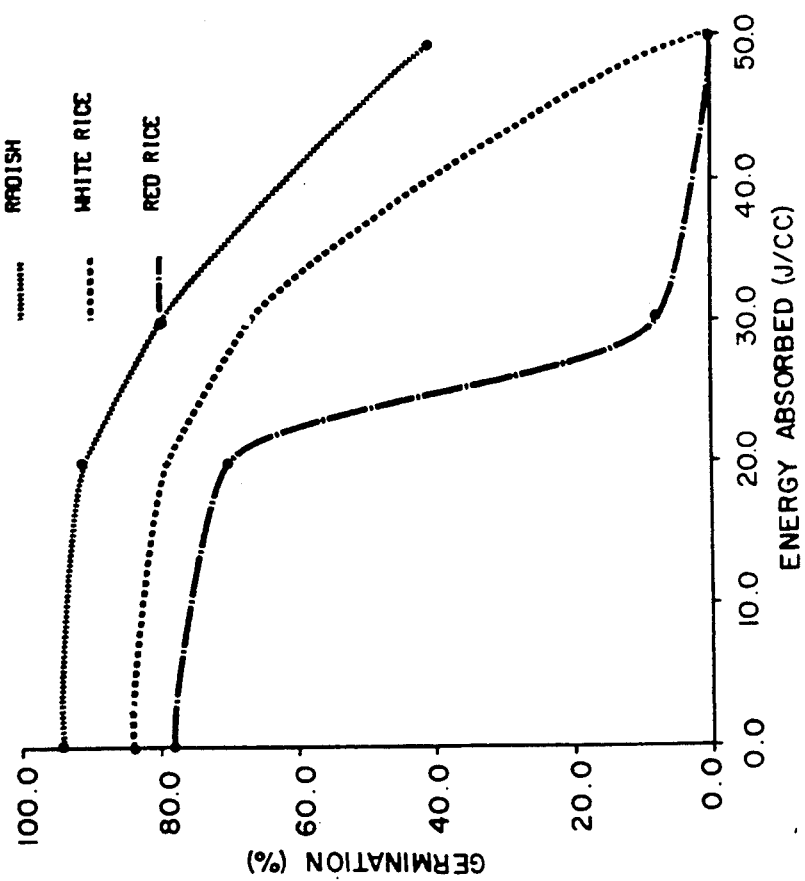
Fig. 5. MICROWAVE IN SANDY LOAM 5,060,414

PHYTOTOXICITY OF A COMBINED RF AND MICROWAVE ELECTROMAGNETIC FIELD

BACKGROUND OF THE INVENTION

1. Field of the Invention

This invention relates to the art of vegetation control, and more particularly to a technique of a plurality of steps in the application of electromagnetic fields of two or more selected but different frequencies, in the sequence of at least one in the radio frequency range and the others in the microwave region, to the area in which vegetation is to be controlled.

2. Description of the Prior Art

The control of weeds has been recognized for centuries as necessary for maximum crop yield. If weeds are allowed to compete for water, soil nutrients, and space, there is generally a substantial drop in eventual crop income. Also, the weed population can contaminate a crop, e.g. red rice, and thus reduce the cash value of the crop. Prior to the 1940's, the only known method of weed control was laborious and expensive hand or mechanical weeding. In the late 1940's, the use of chemical herbicides began to dominate weed control activities. As the use of chemical herbicides escalated, many people began to show concern for the negative effects of the chemicals on the environment.

In 1978 U.S. Pat. No. 4,092,800 was issued. This patent taught the use of microwaves as a herbicide. This technique offered the advantage of control without leaving harmful residues or causing environmental pollution. The development of this method has generally been limited by the energy intensive requirements of this approach coupled with the high cost of fuel. Therefore, this technique has not achieved broad commercial development.

Thus, there has long been a need for an improved vegetation control method which is capable of utilizing electromagnetic waves at low cost.

Further, it is also desired that the method be useful under varying soil composition, compaction and condition.

Additionally, it is also desired that improved method of sterilizing the soil be provided to control fungi, nematodes, insects, etc. as well as weeds.

SUMMARY OF THE INVENTION

Accordingly, it is an object of the present invention to provide a new and improved method of and apparatus for electromagnetic vegetation control.

It is another object of the present invention to provide a method wherein two or more different frequencies of electromagnetic energy are used in a specific sequence to enhance vegetation control.

It is another object of the present invention to provide a method and apparatus which may be tuned to select the preferred mixture of frequencies, energy levels of application for the control of unwanted vegetation or other unwanted organisms.

It is yet another object of the present invention to provide an improved low power method which may be accomplished by a mobile unit.

It is yet another object of the present invention to utilize the method for the control of fungi, nematodes, insects, etc. as well as weeds in growth media for ornamentals (potted plants), mushrooms, and other such applications.

The above and other objects of the present invention are achieved, according to a preferred embodiment thereof, by providing two sets of transmitters and radiators, the first in the radio frequency spectrum and at least a second in the microwave region. For mobile operation, the transmitters and radiators may be mounted on a vehicle. The radiators are mounted so that the electromagnetic field may be applied in close proximity to the soil or planting media to be treated. The radio frequency field is applied first and then the microwave radiation applied within a short time interval. The power levels of the electromagnetic fields and the time duration of their application may be adjusted by the user to accommodate particular soils configuration and condition. It has generally been found that application taught by this method requires only one-half the power required when only a single frequency is used.

BRIEF DESCRIPTION OF THE DRAWING

The above and other embodiments of the present invention may be more fully understood from the following detailed description, taken together with the accompanying drawing, wherein similar reference characters refer to similar elements throughout, and in which:

FIG. 3 is a graph of response to radio frequency exposure;

FIG. 4 is a graph of response to radio frequency then microwave exposure;

FIG. 5 is a graph of response to microwave exposure in a sandy loam media;

FIG. 6 is a graph of response to radio frequency exposure in a sandy loam media;

DESCRIPTION OF A PREFERRED EMBODIMENT

Figure 1:
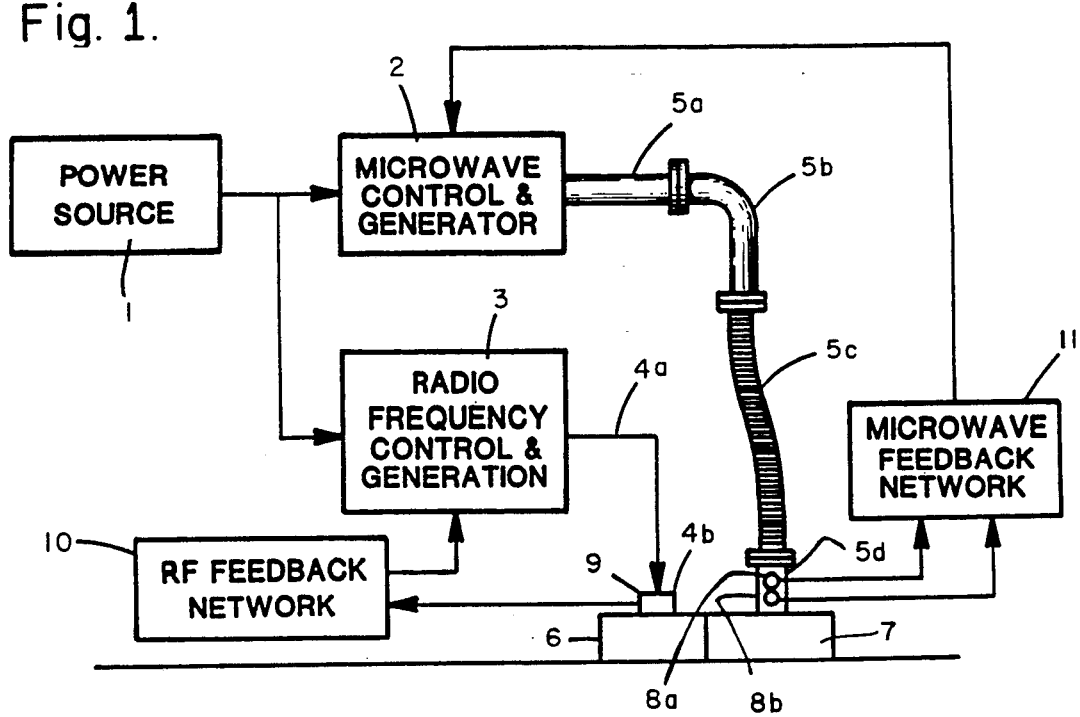
FIG. 1 block diagram of a device which performs the method of applying at least two electromagnetic fields to soil.

Referring now to the drawing, there is illustrated in FIG. 1 a diagrammatic view illustrating the electromagnetic field generating equipment, 2 and 3, the radiating elements, 6 and 7, and the feedback networks, 8 and 9, for effective control of the application according to the teaching of this invention.

The toxicity of microwave fields to plants and seeds is well known in the art. This was taught by Wayland, Jr. et al. in U.S. Pat. No. 4,092,800. Various biological phenomena, which may not be due to thermal effects, have been observed following exposures to electromagnetic radiation. The actual mechanism of the phenomena is not well understood. The results achieved by the teachings of this patent produce unexpected results. Plants and seeds of various species are selectively injured by electromagnetic fields at microwave frequencies. Field studies have indicated that microwave energy can effectively control unwanted vegetation. Thus, it is possible to control unwanted vegetation without the application of chemicals and the resulting chemical overspray, residue and contamination.

However, due to the inefficiencies of the generation and application of microwave radiation, the process using microwaves was expensive.

The present invention teaches the pretreatment of the soil with radio frequency electromagnetic fields before microwave exposure. This pretreatment substantially reduces the energy/cost requirements for the control of unwanted vegetation by microwave radiation.

A series of experiments were performed under lab conditions and control to demonstrate the effectiveness of the present invention.

Control experiments consisting of exposure of seeds in a Petri dish to microwave radiation alone, exposure to radio frequency radiation alone, and exposure to first radio frequency and then to microwave radiation were incorporated in the demonstration.

For the microwave radiation alone, seeds of alfalfa, radish, red rice and white rice were placed on a Petri dish and exposed to microwave radiation for times ranging from 10 to 240 seconds. The source of the microwave radiation was a magnetron operating at 2450 Mhz with a normal power output of 500 watts. The water equivalent of this energy exposure is at a level of about 0.3 joule/gm sec.

For the radio frequency alone, each species was exposed for varying lengths of time in a parallel plate exposure chamber driven by a 1 KW linear amplifier which was excited by a tunable power oscillator in the frequency range of 1.5 to 35 Mhz.

The above process for the exposure of seeds was repeated to provide exposure to the combination of first the radio frequency radiation and then to the microwave radiation with 50% of the energy allocated to each source.

The exposed seeds were then placed between sheets of moist filter paper and kept moist throughout the germination tests.

For the germination test, the temperature was kept in the range of 74 to 85 degrees F. in the daytime and 68 to 75 degrees F. at night at a relative humidity ranging from 56 to 79%. The light intensity was 1,500 foot-candles and the length of day was 14 hours.

Figure 2:
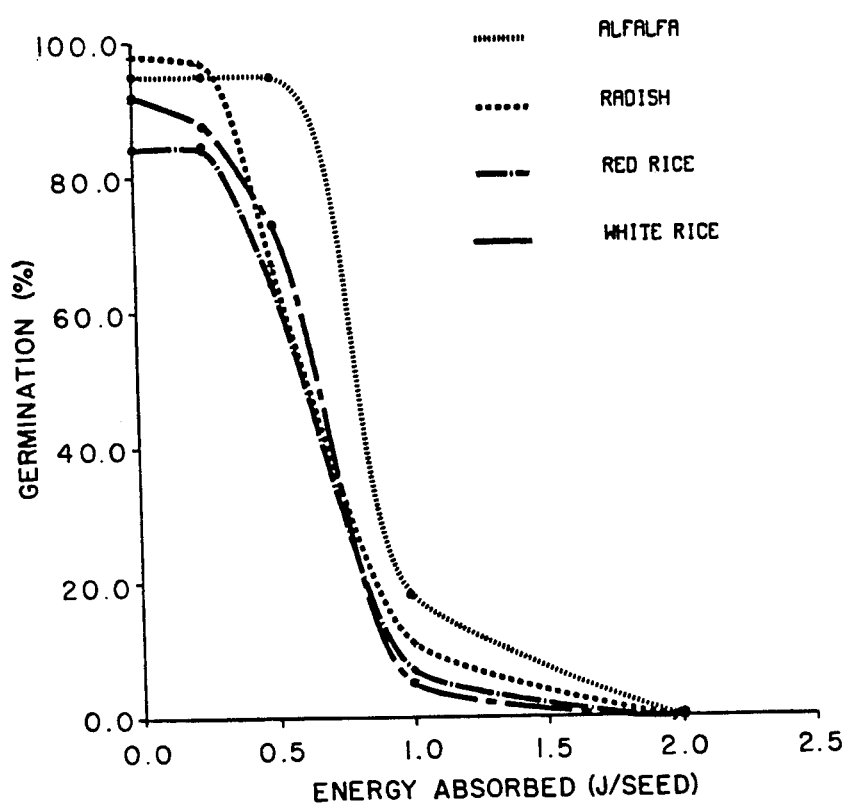
FIG. 2 is a graph of response to microwave exposure.

FIG. 2 depicts the germination response of alfalfa, radish, red rice and white rice to the microwave exposure alone. The energy level for the microwave radiation is approximately 0.5 joule per seed.

FIG. 3 depicts the germination response of the four types of seeds to the radio frequency exposure alone. The germination response is similar to the germination response of the microwave exposure alone. However, there is an increased amount of energy needed for the radio frequency to about 0.7 joule per seed.

FIG. 4 depicts the germination response of the four types of seeds to first the radio frequency and then the microwave radiation. The resulting energy level was just above 0.5 joule per seed. This exposure has produced a response very similar to the response shown in FIGS. 2 and 3.

The results show that exposure of bare seeds to electromagnetic radiation has a significant effect upon the germination rate of the seeds and that the combination of exposure at half-power from each source in the stated order will produce a similar effect.

The experiment was repeated with soil added to the Petri dishes.

The above exposure times and energy levels for the microwave radiation alone and for the radio frequency radiation alone were applied to seeds. The soil was saturated to about 30% water before exposure. After exposure the soil was kept moist, except for the rice which was submerged in water after the seventh day.

The soil experiment for the dual exposure was conducted by again applying only one-half of the energy level first from the radio frequency source and then immediately applying the other one-half of the energy level from the microwave source.

Figure 8:
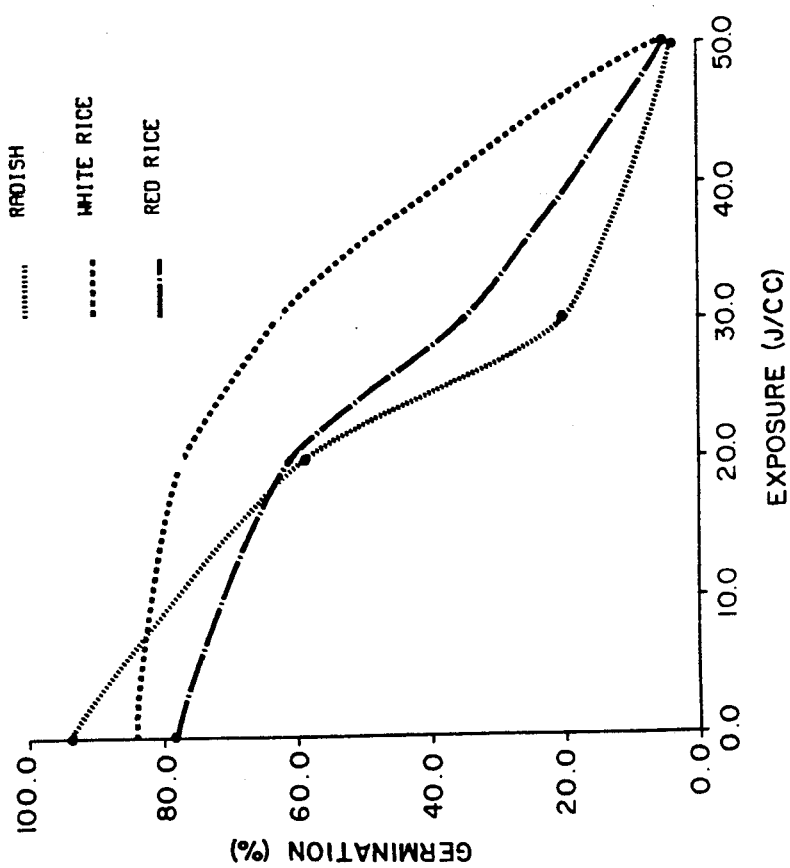
FIG. 8 is a graph of response to microwave exposure in a mixed soil media.
Figure 7:
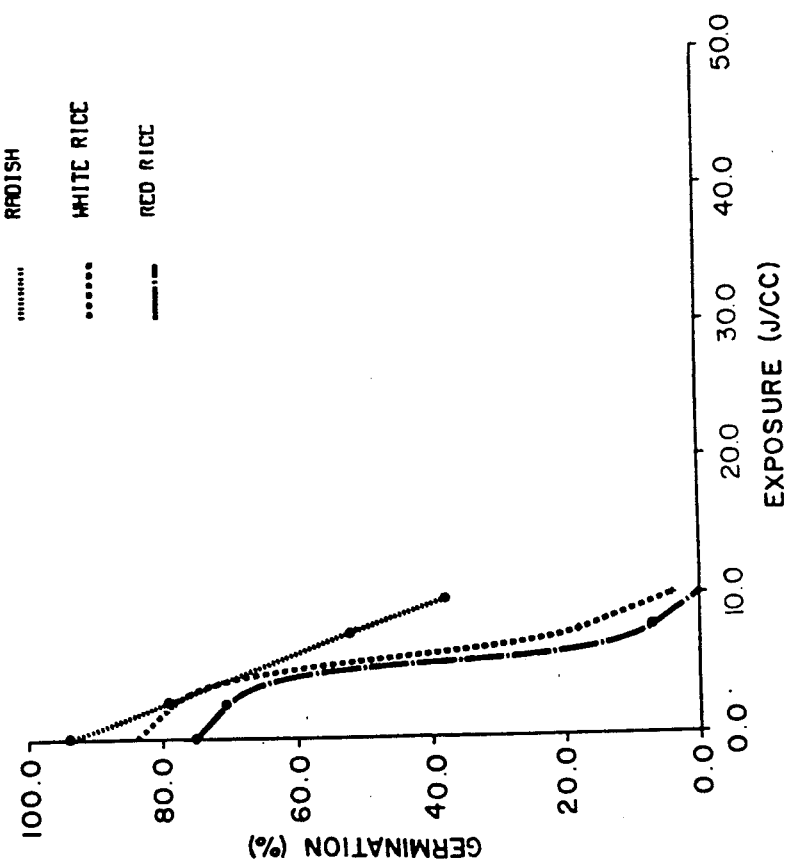
FIG. 7 is a graph of response to radio frequency then microwave exposure in a sandy loam media.
Figure 9:
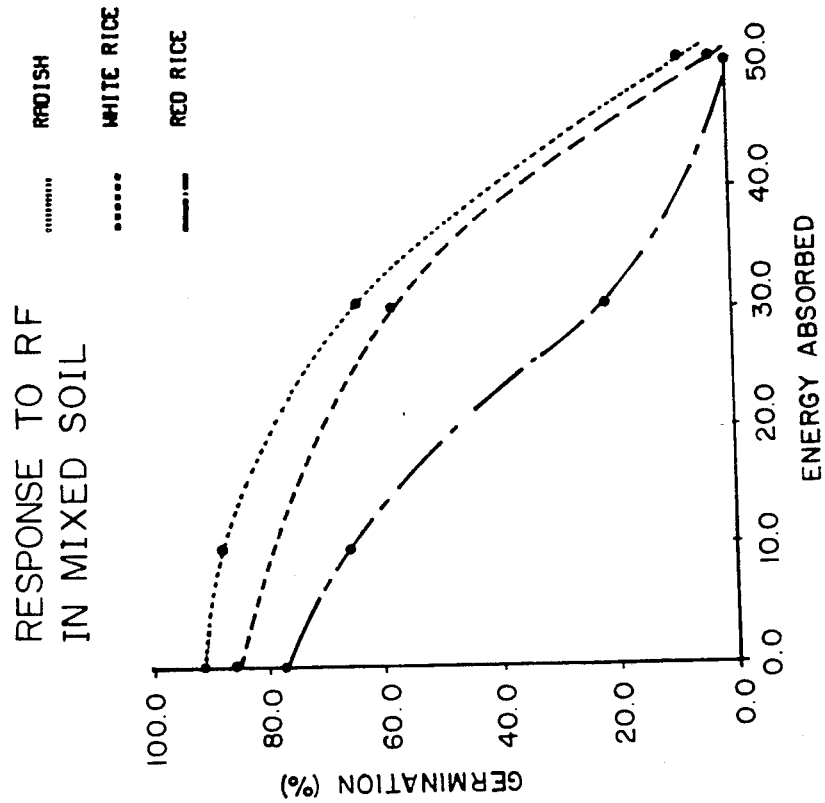
FIG. 9 is a graph of response to radio frequency exposure in a mixed soil media; and, FIG. 10 is a graph of response to radio frequency then microwave exposure in a mixed soil media.

The germination response of seeds contained within a sandy loam soil are shown in FIGS. 5 to 7. The germination response of seeds contained within a mixed soil of clay and sandy loam are shown in FIGS. 8 to 10.

The soil attenuates the electromagnetic field before it penetrated to the seeds. However, the reduction of germination responsive to increased levels of electromagnetic energy is observed. The effective control level of 95% is reached at about 50 joules/cm$^3$ for both the microwave alone (FIGS. 5 and 8) and for the radio frequency alone (FIGS. 6 and 9).

Figure 10:
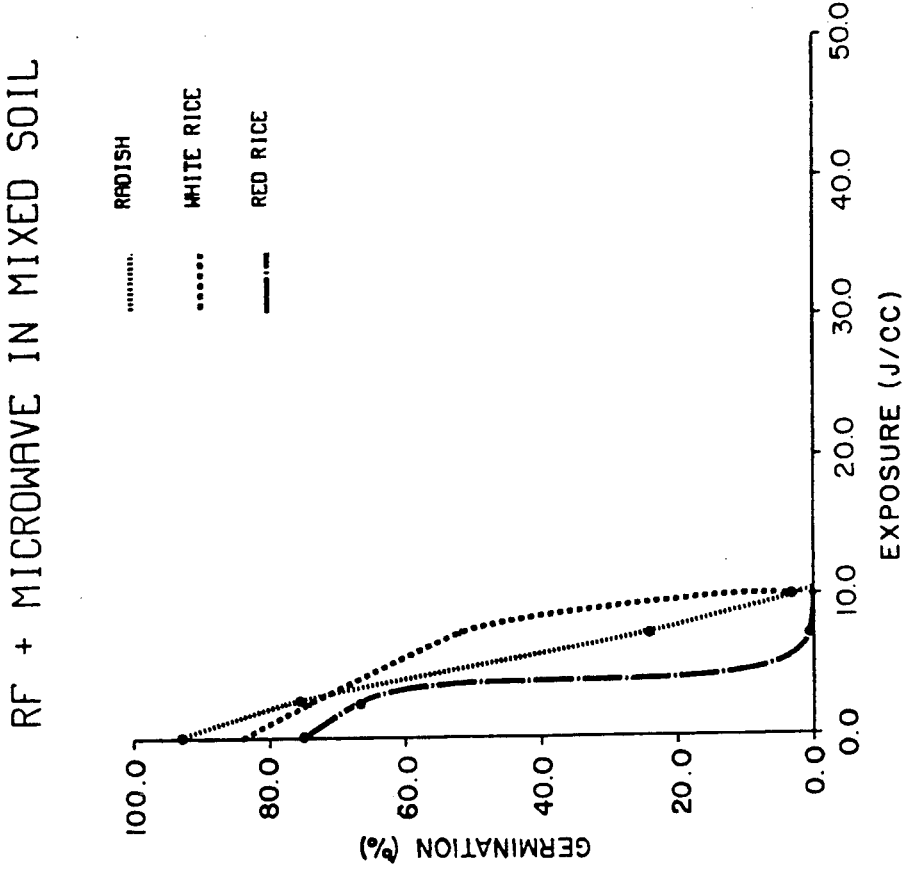

As depicted in FIGS. 7 and 10, a dramatic reduction in energy absorption of about 80% to only about 10 joules/cm$^3$ was required to produce a control level of 95% for the condition of the combination of radio frequency applied first and then microwave radiation being applied to the soil/seed matrix. Thus, there is a marked improvement over the teachings contained in U.S. Pat. No. 4,092,800.

Therefore, the experiments demonstrate that effective control may be achieved with a great reduction of power by using a process which combines the application of radio frequency and microwave radiation first and then radio frequency radiation did not produce any discernible improved results over the application of a single frequency.

The teachings of this invention may be used to construct a stationary or mobile unit to apply the radiation to the manufacturing of such items as potting soil, mushroom pallets, etc. as well as directly to a field on the farm.

The products built according to the teachings of this invention may utilize standard radio frequency feedback networks 10 and standard microwave feedback networks 11 well known in the art shown in FIG. 1.

The microwave electromagnetic waves may be generated by means of a Klystron tube. The control and transmission of the energy by waveguide to the radiator are well known in the art. Of course, good safety engineering practice dictates the incorporation of adequate shielding to protect the operator.

In the preferred embodiment, the radio frequency electromagnetic radiation is applied before exposing the same media to the microwave radiation. It is also preferred that the time interval between the RF application and the MW application be as short as practical.

The RF electromagnetic energy may be radiated as a very uniform electromagnetic field over large areas. The MW energy is highly directional and should be guided to be applied directly into the media.

Depth of penetration into the media is a function of wavelength. The preconditioning of the media by plowing, discing, etc. may dictate the use of a lower frequency generator for specific conditions.

Further, RF may be automatically tuned for variations in moisture content. Under the condition of a wet area being encountered, the radiator load is increased.

The transmitter increases power output in response to increased load.

But because MW is constant power output, the MW system does not automatically compensate upon encountering a change in soil condition. Therefore, the user may chose different power settings for preselected areas of treatment if the media conditions are sufficiently variable.

A continuous wave is used in the preferred embodiment. If a pulsed wave is selected due to engineering or economic considerations such as a desire to utilize standard transmitters, the pulsed waves must have an on-time of at least 33% to be effective.

Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A method of vegetation and pest control in a planting media comprising the steps of:
   first, generating a plurality of preselected radio frequency electromagnetic fields at preselected power levels for emission from radiators;
   second, generating a plurality of preselected microwave electromagnetic fields at preselected power levels for emission from radiators;
   positioning said radiators to expose said media to said electromagnetic fields whereby the application of said microwave electromagnetic fields for a preselected duration follows immediately after the application of said radio frequency electromagnetic fields for a preselected duration to produce death or debilitation of the vegetation and pests.

2. A method of vegetation and pest control in planting media defined in claim 1 wherein said generated electromagnetic fields are pulsed waves.

3. A method of vegetation and pest control in planting media defined in claim 1 wherein said generated electromagnetic fields are continuous waves.

4. A method of vegetation and pest control in planting media defined in claim 1 wherein said generated electromagnetic fields are modulated waves.

5. A method of vegetation and pest control in planting media defined in claim 1 wherein said generated electromagnetic fields are a combination of continuous, pulsed and modulated waves.

6. An improved electromagnetic field generation and application arrangement for the control of vegetation and pests in planting media, comprising, in combination:
   a means for generating a radio frequency electromagnetic field;
   a means for generating a microwave electromagnetic field;
   a radio frequency radiator connected to said radio frequency generation means;
   a microwave radiator connected to said microwave generation means;
   means for applying said electromagnetic radiation to said planting media under the conditions of bringing said radiators in proximity to said planting media whereby the application of said microwave electromagnetic fields for a preselected duration follows immediately after the application of said radio frequency electromagnetic fields for a preselected duration.

7. The arrangement defined in claim 6 wherein:
said means to apply is a vehicle.

8. The arrangement defined in claim 6 wherein:
said means to apply is a conveyer belt to guide said planting media into the proximity of said radiators.

* * * * *